United States Patent
Ali et al.

(10) Patent No.: US 10,956,885 B2
(45) Date of Patent: Mar. 23, 2021

(54) APPARATUS AND METHOD FOR PAYMENT PROCESSING

(71) Applicant: MONERIS SOLUTIONS CORPORATION, Toronto (CA)

(72) Inventors: Shem Ali, Toronto (CA); Spencer Lai, Mississauga (CA); Caleb Reynolds, Toronto (CA); Massoud Fattahi, Thornhill (CA); Christian Malek, Oakville (CA); Mark Poon, Mississauga (CA)

(73) Assignee: MONERIS SOLUTIONS CORPORATION, Toronto (CA)

( * ) Notice: Subject to any disclaimer, the term of this patent is extended or adjusted under 35 U.S.C. 154(b) by 89 days.

(21) Appl. No.: 16/098,822

(22) PCT Filed: May 12, 2017

(86) PCT No.: PCT/CA2017/000127
§ 371 (c)(1),
(2) Date: Nov. 2, 2018

(87) PCT Pub. No.: WO2017/193205
PCT Pub. Date: Nov. 16, 2017

(65) Prior Publication Data
US 2019/0139016 A1    May 9, 2019

Related U.S. Application Data

(60) Provisional application No. 62/337,108, filed on May 16, 2016, provisional application No. 62/336,457, filed on May 13, 2016.

(51) Int. Cl.
*G06Q 20/20* (2012.01)
*G07F 7/08* (2006.01)
(Continued)

(52) U.S. Cl.
CPC ............ *G06Q 20/202* (2013.01); *G06F 8/65* (2013.01); *G06Q 20/20* (2013.01); *G06Q 20/209* (2013.01);
(Continued)

(58) Field of Classification Search
CPC ........ G06Q 20/00; G06Q 20/20; G06Q 30/00; G06Q 20/40; G06Q 20/32; G06Q 20/12;
(Continued)

(56) References Cited

U.S. PATENT DOCUMENTS 9,171,304 B2* 10/2015 Mutha .............. G06Q 20/40975
9,870,556 B2*  1/2018 Wieler ................... G06Q 20/22
(Continued)

FOREIGN PATENT DOCUMENTS

WO    2007001239 A1    1/2007

OTHER PUBLICATIONS

Canadian Intellectual Property Office (CIPO), International Search Report and Written Opinion dated Aug. 15, 2017 in respect of PCT Application No. PCT/CA2017/000127.
(Continued)

*Primary Examiner* — Olusegun Goyea
(74) *Attorney, Agent, or Firm* — Greenberg Traurig, LLP (57) ABSTRACT

A computer server and method for payment processing are described herein. A server has a module for forming an encrypted connection with a payment terminal, and pairs a merchant sales terminal with the payment terminal. Communications between the payment terminal and merchant sales terminal are carried out through the server, which converts messages into the appropriate format for each terminal. After the transaction is carried out, the server returns receipt information to the sales terminal for receipt generation.

22 Claims, 5 Drawing Sheets

(51) Int. Cl.
*G06Q 20/38* (2012.01)
*G06F 8/65* (2018.01)
*G06Q 20/42* (2012.01)
*H04L 29/06* (2006.01)

(52) U.S. Cl.
CPC ........... *G06Q 20/38* (2013.01); *G06Q 20/382* (2013.01); *G06Q 20/42* (2013.01); *G07F 7/0886* (2013.01); *H04L 63/0428* (2013.01)

(58) Field of Classification Search
CPC ........ G06Q 20/38; G06B 17/00; G06F 9/445; G06F 15/16
USPC ............ 705/14.4, 1.1, 16, 17, 18, 21, 44, 40
See application file for complete search history.

(56) References Cited

U.S. PATENT DOCUMENTS

| | | | | |
|---|---|---|---|---|
| 10,275,774 | B2* | 4/2019 | Mutha | G06Q 40/02 |
| 10,592,884 | B2* | 3/2020 | Wieler | G06Q 20/28 |
| 10,726,681 | B1* | 7/2020 | Durieux | G07G 1/0045 |
| 10,769,620 | B2* | 9/2020 | Agarwalla | G06Q 20/206 |
| 10,810,597 | B2* | 10/2020 | Mutha | G06Q 20/206 |
| 2003/0229590 | A1* | 12/2003 | Byrne | G06Q 20/04 |
| | | | | 705/40 |
| 2008/0270514 | A1* | 10/2008 | Soares Pi Farias | G06Q 20/202 |
| | | | | 709/202 |
| 2010/0058317 | A1* | 3/2010 | Braams | G06F 21/572 |
| | | | | 717/171 |
| 2012/0303425 | A1* | 11/2012 | Katzin | G06Q 20/32 |
| | | | | 705/14.4 |
| 2013/0132215 | A1* | 5/2013 | Mutha | G06Q 30/06 |
| | | | | 705/16 |
| 2014/0046786 | A1* | 2/2014 | Mazaheri | G06Q 20/206 |
| | | | | 705/18 |
| 2014/0052553 | A1* | 2/2014 | Uzo | G06Q 20/322 |
| | | | | 705/18 |
| 2014/0351072 | A1* | 11/2014 | Wieler | G06Q 20/405 |
| | | | | 705/21 |
| 2015/0032634 | A1* | 1/2015 | D'Agostino | G06Q 20/3829 |
| | | | | 705/71 |
| 2015/0095133 | A1* | 4/2015 | Parker | G06Q 20/202 |
| | | | | 705/14.38 |
| 2015/0178708 | A1* | 6/2015 | Reutov | G06Q 20/027 |
| | | | | 705/44 |
| 2015/0186866 | A1* | 7/2015 | Lund | G06Q 20/3825 |
| | | | | 705/71 |
| 2015/0302374 | A1* | 10/2015 | Sartor | G06Q 20/14 |
| | | | | 705/16 |
| 2017/0091732 | A1* | 3/2017 | Rezayee | G06Q 20/202 |
| 2017/0091762 | A1* | 3/2017 | Rezayee | G06Q 20/3278 |
| 2017/0344984 | A1* | 11/2017 | Jeong | H04L 63/06 |
| 2017/0364346 | A1* | 12/2017 | Peng | G06F 13/102 |
| 2018/0315038 | A1* | 11/2018 | Rezayee | H04W 76/10 |

OTHER PUBLICATIONS

Anonymous: EMV payment devices/terminals integration with eConduit (Blackline) payment gateway on POS application, Apr. 16, 2016, XP55626827, Retrieved from the Internet: URL:https://web.archive.org/web/20160416145822/https://ktree.com/blog/EMV-payment-devices-terminals-integration-with-eConduit-payment-gateway-on-POS-application.html, retrieved Sep. 27, 2019, 18 pgs. web/20160416145822/https://ktree.com/blog/Emv-payment-devices-termi.
European Patent Office, Supplementary Search Report issued in EP 17 79 5211.6, 2 pgs.

* cited by examiner

APPARATUS AND METHOD FOR PAYMENT PROCESSING

CROSS-REFERENCE TO RELATED APPLICATIONS

The present application claims the benefit of U.S. Provisional Patent Application Nos. 62/336,457 and 62/337,108, filed on May 13, 2016 and May 16, 2016, respectively. All of the foregoing applications are hereby incorporated by reference in their entireties.

TECHNICAL FIELD

The present application relates to devices used for processing transactions, in particular to communications between merchant sales terminals and payment terminals.

BACKGROUND

Modern retail transactions provide a number of options for payment by a consumer. A merchant sales terminal (also referred as a point of sale (POS) device) is a device used by the merchant to calculate an amount owed by the customer and present transaction information for payment, e.g. by generating an invoice or bill. The customer then makes payment to the merchant. After receiving payment, the merchant normally issues a receipt to the customer for the transaction.

Often at the point of sale, the customer will choose to make payment using a card (e.g. a debit card or credit card), wireless payment device (such as mobile phone or tablet), or the like. Such payment methods may necessitate the entry of credentials, such as a personal identification number (PIN), and customer authorization. Entry of the customer's credentials is done via a payment terminal, such as a Secure PIN Entry Device (SPED).

Integration between merchant sales terminals and payment terminals can be quite complex. A merchant sales terminal can take the form of a tablet, personal computer, mobile phone, or the like, but in most cases there is a physical connection between the merchant sales terminal and the payment terminal. Each payment terminal typically has its own particular setup with a specific communication protocol, which makes it difficult and expensive for integrators (e.g. merchants or independent software vendors) to certify and integrate their sales terminals with more than one payment terminal model.

Currently, merchant sales terminals are required to communicate locally and directly with a given payment terminal. This direct communication may take place via serial port, USB, Bluetooth and/or through connections to a router using Internet Protocol, which requires the installation of drivers and APIs. This may require, among other things, consent from merchant sales terminal hardware manufacturers (e.g. Apple) in some cases to install certain software packages. Furthermore, it can be difficult to troubleshoot issues on payment terminals (e.g. hardware failures, or communication failures between devices), as processors are not able to run diagnostics remotely on payment terminals. Moreover, it is inefficient and costly to update software on payment terminals.

Merchant sales terminal developers are often reluctant to install third party software (that is, software developed by anyone who is not the maker of the merchant sales terminal) on sales terminals. Moreover, merchants periodically upgrade payment terminals over time, and each such upgrade currently requires obtaining and installing new drivers, and developing new software according to the API for the new payment terminal. This, again, is time consuming and complex.

SUMMARY

In accordance with one aspect of the present invention, there is provided a computer server for payment processing, comprising: a network interface; a processor; a memory containing computer-readable instructions for execution by said processor, said instructions comprising: a terminal connection module for receiving a connection request from a payment terminal by way of said network interface, and forming an encrypted network connection with said payment terminal; a pairing module for receiving a pairing request identifying said payment terminal from a merchant sales terminal, and associating said payment terminal with said merchant sales terminal in a data structure; a transaction request module for receiving a first message from said merchant sales terminal defining transaction parameters in a first data format, generating a second message containing said transaction parameters in a second data format compatible with said payment terminal, and sending said second message to said payment terminal over said encrypted network connection; a receipt delivery module for receiving a payment credential message from said payment terminal over said encrypted network connection in said second data format, generating a receipt message in said first data format, and sending said receipt message to said merchant sales terminal.

In accordance with another aspect of the present invention, there is provided a method of processing payments comprising, at a server: receiving a connection request from a payment terminal by way of a network interface, and forming an encrypted network connection with said payment terminal; receiving, from a merchant sales terminal, a pairing request identifying said payment terminal, and associating said payment terminal with said merchant sales terminal in a data structure; receiving a first message from said merchant sales terminal defining transaction parameters in a first data format, forming a second message containing said transaction parameters in a second data format compatible with said payment terminal, and sending said second message to said payment terminal over said encrypted network connection; receiving a payment credential message from said payment terminal over said encrypted network connection in said second data format, generating a receipt message in said first data format, and sending said receipt message to said merchant sales terminal.

BRIEF DESCRIPTION OF THE DRAWINGS

In the figures, which illustrate example embodiments.

DETAILED DESCRIPTION

Figure 1:
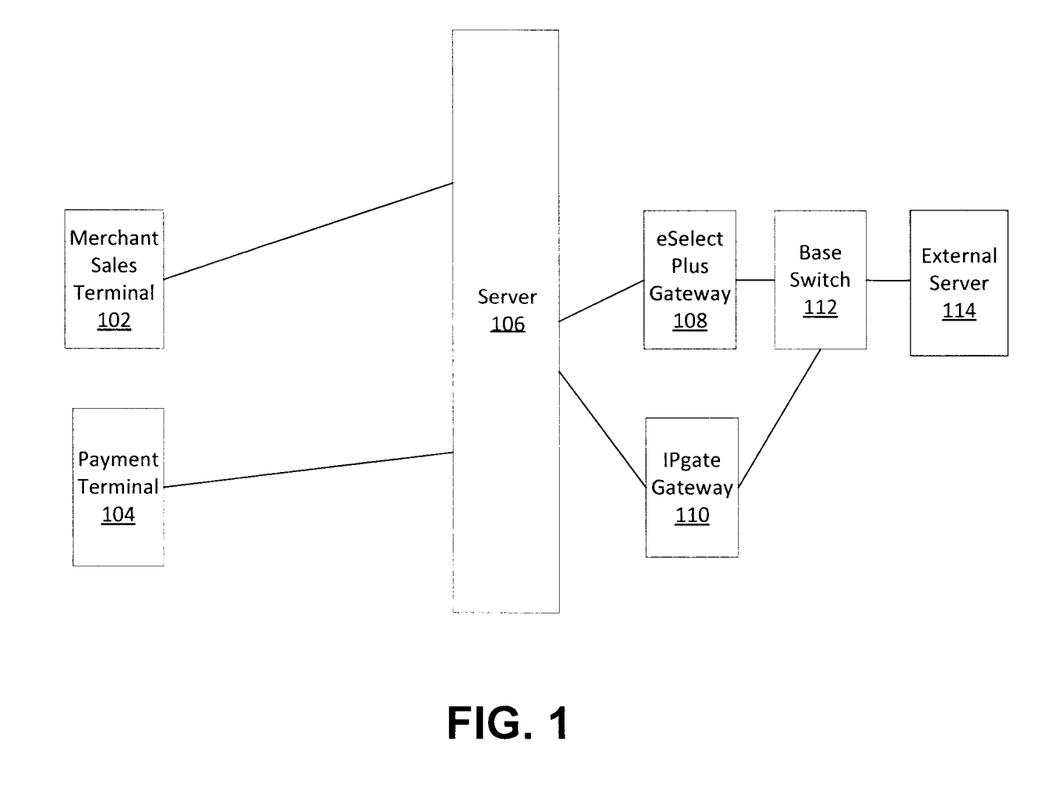
FIG. 1 is a block diagram of an example payment processing system.

FIG. 1 is a block diagram of an example payment processing system. The merchant side comprises a merchant sales terminal 102 and a payment terminal 104. The non-merchant side comprises a server 106, gateway devices 108 and 110 and a base switch device 112. Gateway devices 108, 110 and base switch device 112 may interface server 106 with systems of financial institutions, card issuers, or the like. Different gateway devices may, for example, handle different types of transactions, transactions related to different issuers or financial institutions, or the like. In some embodiments, the gateway device 108 is an eSelect Plus gateway, the gateway device 110 is an IPgate gateway, and the server 106 is a cloud communication server. In some embodiments, the IPgate gateway 110 communicates with the server 106 via a secure sockets layer (SSL) connection. In some embodiments, the eSelect Plus gateway 108 communicates with the server 106 via a Hypertext Transfer Protocol over SSL (HTTPS) connection. As depicted, two gateway devices are present. However, more or fewer gateway devices may be present in other embodiments, and the gateway devices may be devices other than eSelect Plus or IPgate gateways.

The merchant sales terminal 102 may be, for example, a mobile device (e.g. a tablet, a smartphone, or the like) or a wired device (e.g. a PC terminal). Devices suitable to serve as the merchant sales terminal include devices capable of an IP-based encrypted connection to the server 106. The merchant sales terminal 102 may run any operating system (e.g. iOS, Android, Microsoft Windows, Linux, or the like). The merchant sales terminal 102 can also transmit a pairing request to the server 106 to be paired with a payment terminal 104, and transmit a request to the server 106 to initiate a transaction. Such requests may be transmitted in the form of electronic messages in a suitable data format, such as HTTP. The merchant sales terminal 102 can receive receipt messages after a transaction has been completed from server 106. In some embodiments, the merchant sales terminal 102 can generate receipts.

Some embodiments work in cooperation with the various payment processing systems, merchant sales devices, sales terminals and plug-ins offered by, for example, NetSuite. Such devices, sales terminals and plug-ins are described in a technical document entitled "Payment Processing Plug-in", Version 2016, Release 1, which is included as Appendix A in U.S. Provisional Application No. 62/337,108, which is incorporated by reference. For example, in some embodiments, one or more of the server 106 and gateways 108, 110 is configured to receive requests or provide responses constructed in accordance with the Payment Processing Plug-in document.

The payment terminal 104 may be, for example, a secure PIN entry device (SPED). Various models of payment terminal are available, and include devices produced by VeriFone and Ingenico. Payment terminal 104 typically includes a slot for accepting insertion of a card (e.g. a debit card or a credit card), and may also include a detector for detecting a card wirelessly (e.g. through the PayPass, PayWave and ExpressPay technologies offered by various vendors of payment terminals). Payment terminal 104 typically also includes a keypad comprising numbers and various inputs with other functionality, including hot keys with specific functionality. Payment terminal 104 typically communicates with merchant sales terminal 102 according to specific communication protocols and message formats. Such communication typically necessitates the installation of drivers and APIs on the merchant sales terminal 102 in order to communicate with a particular payment terminal 104 in the required data format. The communication protocols used by payment terminals 104 may vary with the manufacturer and model of the particular payment terminal 104.

Figure 2:
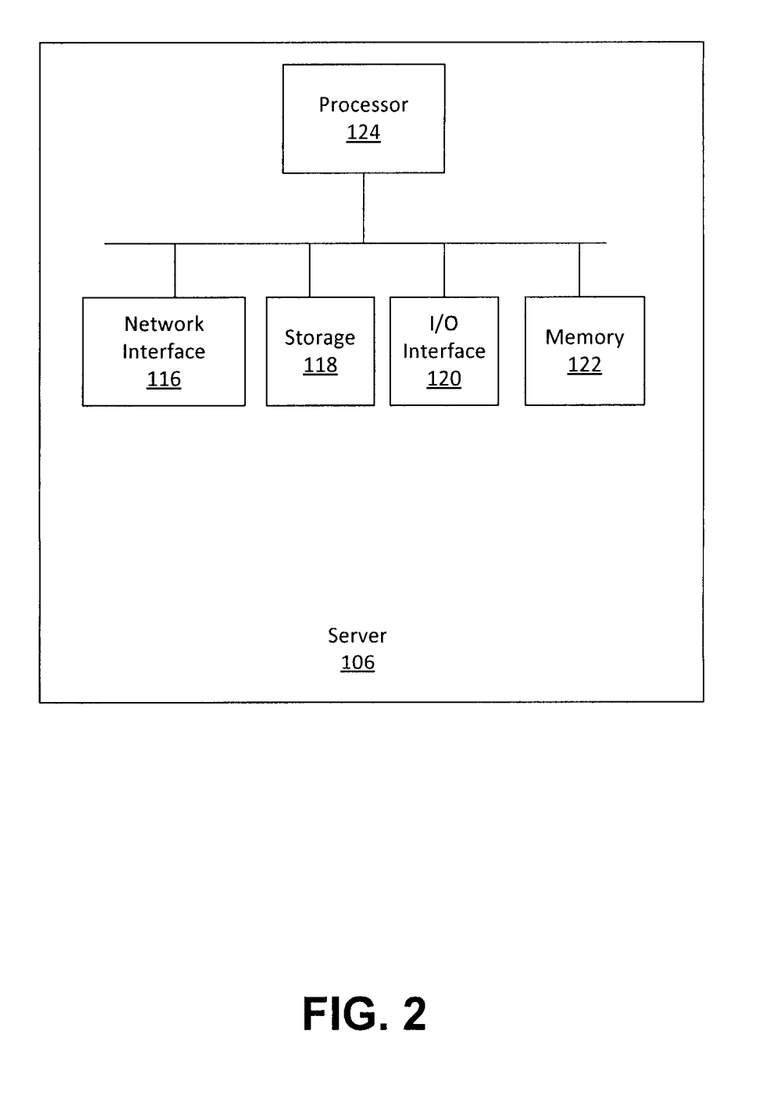
FIG. 2 is a block diagram of example components of a server.

FIG. 2 is a block diagram of components of an example server 106. As depicted, the server 106 includes a processor 124, network interface 116, memory 122, persistent storage 118, and input/output interface 120.

Processor 124 may be an Intel or AMD x86 or x64, PowerPC, ARM processor, or the like. Processor 124 may operate under control of software loaded in memory 122. Network interface 116 allows the server 106 to connect to other devices, including the merchant sales terminal 102, payment terminal 104, eSelect Plus gateway 108 and IPgate gateway 110. I/O interface 120 connects server 106 to one or more peripherals such as keyboards, mice, USB devices, disc drives, and the like.

Figure 3:
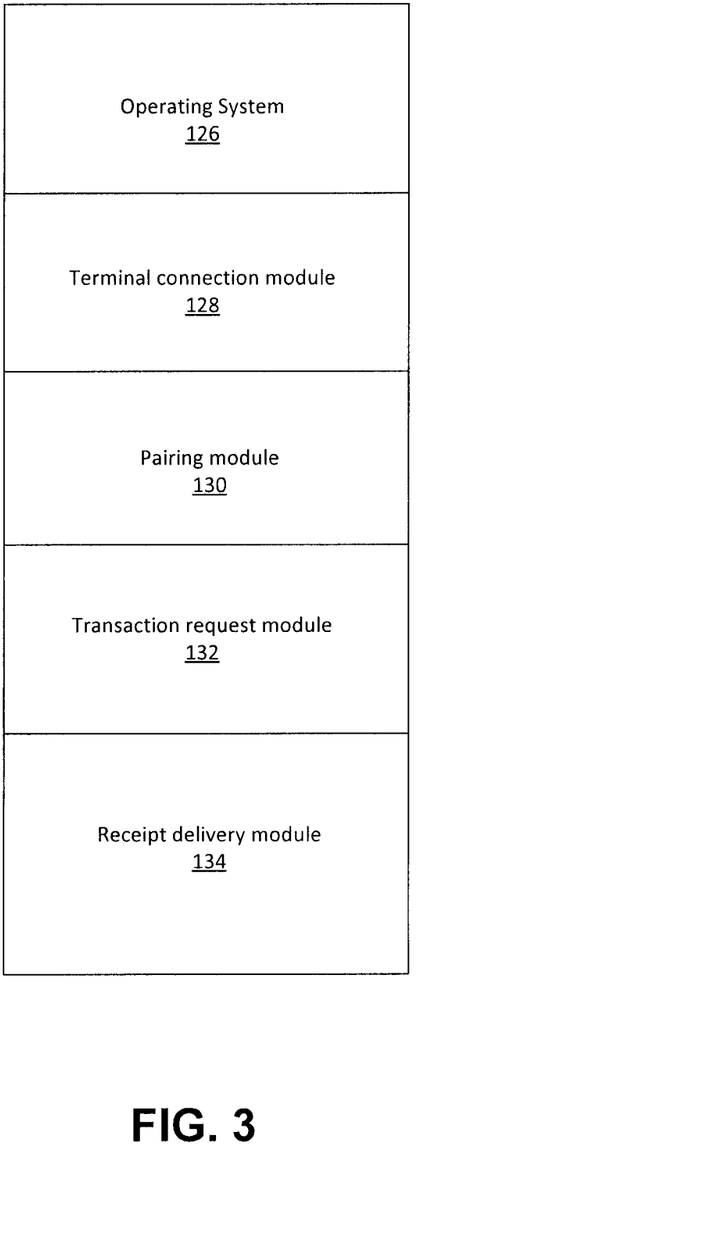
FIG. 3 depicts a simplified arrangement of software on a server.

Software may be loaded onto server 106 from peripheral devices or from network devices. Such software may be executed using processor 124. FIG. 3 depicts a simplified arrangement of software at server 106. The software may include an operating system 126 and application software, such as a terminal connection module 128, pairing module 130, transaction request module 132, and receipt delivery module 134.

In broad terms, in order to carry out a transaction, the merchant sales terminal 102 transmits a request to the server 106. After this, the sales terminal 102 awaits a receipt message from the server 106. The server 106 extracts the information from the request and packages the information into a data structure compatible with payment terminal 104. The server 106 then transmits the information package to the payment terminal 104, which initiates the transaction according to the payment terminal's standard protocols.

Once the transaction has been initiated, the payment terminal 104 transmits a financial message to the server 106, which then routes the financial data through the appropriate gateway and to the base switch 112, which transmits the transaction data to the appropriate external third party card network server 114 (e.g. the MasterCard or Visa network) for approval.

The base switch 112 then receives a reply from the card network server 114 indicating whether the transaction was approved or declined, together with other information (for example, a transaction ID, the amount of the transaction, certain digits from the card used for the transaction, or the like). This reply is then routed back to server 106 for formatting, and then sent to payment terminal 104.

The payment terminal 104 completes the transaction based on the reply information, and then sends a summary transaction receipt message to server 106. The server 106 then repackages this data and sends it to merchant sales terminal 102 in order to create a receipt.

From this brief overview, it will be appreciated that a benefit of using the server 106 is that the financial data from the payment terminal is routed through the server 106 to base switch 112, and not through the merchant sales terminal 102. Thus, the merchant sales terminal 102 is not exposed to any sensitive card data throughout the transaction. The merchant sales terminal 102 merely sends a transaction request to the server 106 and then awaits a message from the server 106 containing receipt information once the transaction is complete.

Figure 4:
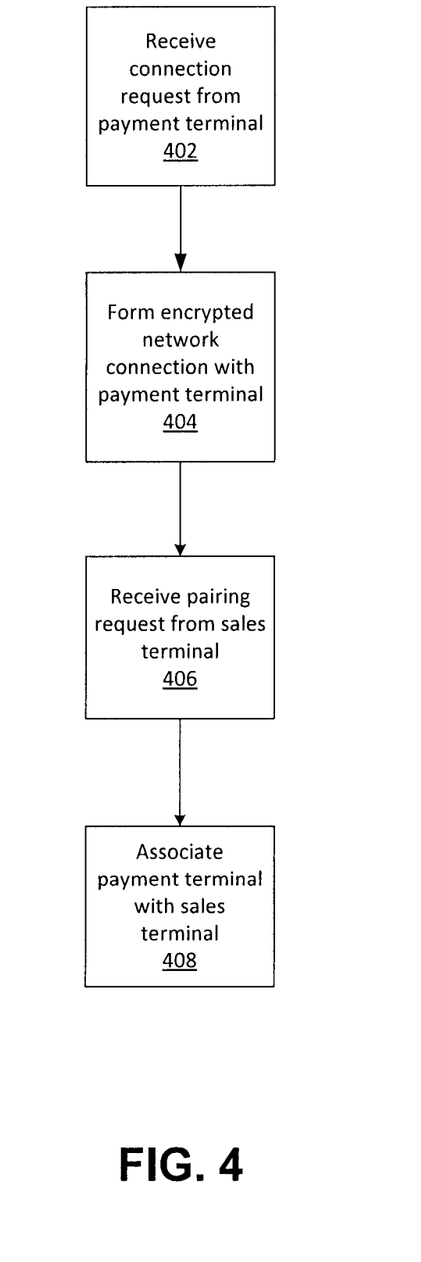
FIG. 4 is a flow chart depicting an example method of pairing a payment terminal to a merchant sales terminal.

FIG. 4 is a flow chart depicting an example process for pairing a merchant sales terminal to a payment terminal. In some embodiments, the payment terminal 104 acts as a client of the server 106. At block 402, the server 106 receives a connection request from payment terminal 104 by way of network interface 116. In some embodiments, the payment terminal 104 transmits the connection request to the server 106 when booted for the first time, and the connection request includes at least one of a terminal ID for the payment terminal 104 and a serial number for the payment terminal 104. At block 404, the server 106 forms an encrypted network connection with the payment terminal 104. In some embodiments, after establishing the encrypted connection with server 106, the payment terminal 104 awaits further instructions from the server 106. In some embodiments, the encrypted connection comprises a TLS connection. Other encryption techniques are possible, for example the encrypted connection can be an SSL connection or other suitable encrypted connection.

At block 406, the server receives a pairing request from merchant sales terminal 102, wherein the pairing request identifies the payment terminal 104. In some embodiments, the payment terminal 104 is identified in the pairing request by a terminal ID. In some embodiments, the payment terminal 104 displays a numeric or alphanumeric code which the merchant can include with the pairing request to identify the desired payment terminal 104 for pairing. At block 408, the server 106 associates the payment terminal 104 with the merchant sales terminal 102 in a data structure. In some embodiments, the server 106 recognizes the payment terminal 104 by its terminal ID or code.

In some embodiments, after association, the server 106 sends an association confirmation message to the payment terminal 104 and the sales terminal 102. In some embodiments, the payment terminal 104 and/or the merchant sales terminal 102 display alerts to the user after receiving the association confirmation message.

Figure 5:
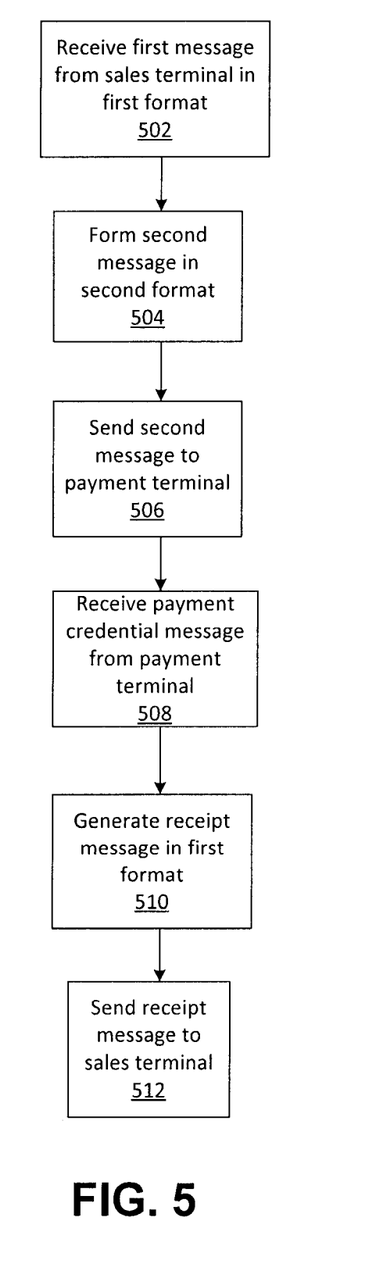
FIG. 5 is a flow chart depicting an example method of payment processing.

FIG. 5 is a flow chart depicting an example process for processing a transaction. To initiate a transaction, the merchant sales terminal 102 gathers transaction data, e.g. by barcode scanning, user input or the like. The transaction data includes transaction parameters such as transaction type and transaction amount. Optionally, the transaction data may include, for example, customer identification data, invoice line item data, or other transaction data. Merchant sales terminal 102 encodes transaction parameters into a message in a data format, e.g. JSON, XML, form variable, key value-paired, or the like. The merchant sales terminal 102 transmits the message to server 106 using a communication protocol (for example, HTTP or HTTPS). In some embodiments, the first message is an HTTP or HTTPS POST message. At block 502, the server 106 receives the message. In some embodiments, the message is received directly from the sales terminal 102. In some embodiments, the sales terminal 102 sends the message to a merchant network server (not shown), and the merchant network server forwards the message to the server 106.

The merchant sales terminal 102 may initiate the transaction through an application running on the merchant sales terminal 102, however there is no requirement that the merchant sales terminal 102 execute any particular software application in order to achieve compatibility with the payment terminal 104. For example, there is no need for the merchant sales terminal 102 to execute any specialized software (e.g. designed by a third party) to communicate with a payment terminal 104. Rather, sales terminal 102 need only transmit an HTTPS POST message to server 106, regardless of the make or model of the payment terminal 104 that will be used to conduct the transaction.

In some embodiments, the HTTPS POST message comprises at least the following information: a) merchant credentials; b) data identifying the payment terminal 104 to be used for the transaction (e.g. a terminal ID), and c) transaction details, which may include the transaction type (purchase, refund, purchase-void, refund-void, or the like), the dollar amount, an order ID number, fraud data, whether to provide the option of tipping, or the like. Other data which may be included with the HTTPS POST message may include line item numbers and a customer ID. In some embodiments, communications from the merchant sales terminal 102 to the server 106 are encrypted using HTTPS, and communications from the payment terminal 104 to the server 106 are also encrypted using HTTPS. In some embodiments, the connection between the payment terminal 104 and the server 106 is a Transport Layer Security (TLS) or an SSL connection.

In some embodiments, if a merchant only has one payment terminal 104, the terminal ID can be omitted from the HTTPS POST message, as the server 106 maintains a backend database in storage 118 which associates payment terminals 104 with merchant IDs.

Once the first message is received by the server 106, the server 106 then processes the request, extracts the relevant transaction data, and at block 504, generates a second message containing the extracted data in a second format which is compatible with the payment terminal 104 identified in the first message. In some embodiments, the server 106 maintains a database of each payment terminal 104 that has been provisioned to merchants, and so the device information pertaining to a particular payment terminal 104 is available to the server 106.

At block 506, the server 106 then sends the second message to the payment terminal 104. The payment terminal 104 then initiates the requested transaction. The payment terminal 104 provides the necessary prompts to the customer or cardholder (e.g. insert card, authorize transaction amount, tip, or the like). Once the necessary input has been obtained from the customer or cardholder, the payment terminal 104 generates a third message containing financial data relating to the transaction which is transmitted by the payment terminal 104 to the server 106. In some embodiments, the payment terminal bypasses server 106 and transmits the third message directly to gateway 108 or 110.

In some embodiments, the format of the third message is consistent with conventional transactional systems (which may vary depending on the whether the card is, for example, MasterCard or Visa, or the like), and may include an encrypted card number, an expiry date, and encrypted EMV data. The term "EMV" is a shorthand way to refer to Europay, MasterCard and Visa, although it will be appreciated that other card types outside of the major institutions may also be used with the systems and methods described herein.

In some embodiments, the server 106 receives the third message from the payment terminal 104 and the server then routes the third message to the appropriate external network 114 to determine whether the transaction is approved or declined. Depending on the format of the third message received by the server 106, the server 106 will determine the appropriate gateway 108 or 110 to forward the third message to. The server then sends the third message to the appropriate gateway. In some embodiments, the server 106 communicates with the IPgate gateway 110 using an SSL connection, and the server 106 communicates with the eSelect Plus gateway 108 using an HTTPS connection. The selected gateway will repackage the third message into a fourth message in a format acceptable to the intended recipient network (e.g. Visa, MasterCard, or the like). The fourth message is sent to base switch 112. The base switch 112 transmits the fourth message to the appropriate external network.

After the external network (e.g. Visa, MasterCard, or the like) has processed the transaction request, the external network server 114 will return a fifth message to the base switch 112. The base switch 112 will then identify the source of the fifth message and route the fifth message to the appropriate gateway 108 or 110 for formatting and processing. The relevant data from the fifth message is then sent to server 106, which formats the relevant data into a sixth message compatible with the payment terminal 104. The server 106 then transmits the sixth message to payment terminal 104. In some embodiments, the gateway 108 or 110 transmits the fifth message directly to payment terminal 104 without the additional formatting at server 106.

The contents of the sixth message may include, for example, an indication of whether the transaction was approved or declined, a response code for the transaction, the amount of the transaction, the first 4 and last 4 digits of the card number used, the card type, and any other details required in order to ultimately generate a receipt. In embodiments where the gateway 108 or 110 communicates directly with payment terminal 104, the fifth message comprises similar contents to the sixth message previously described.

Upon receiving the sixth message from server 106 (or fifth message if transmitted directly from gateway 108 or 110), the payment terminal 104 will then provide the customer/cardholder with an indication as to whether the transaction was approved or declined. The payment terminal 104 will then generate a payment credential message containing the data necessary for generating a receipt, and the payment terminal 104 sends the payment credential message to the server 106 over the encrypted network connection in the second data format. At block 508, the server 106 receives the payment credential message. At block 510, the server 106 processes the payment credential method and generates a receipt message in the first data format. At block 512, the server 106 sends the receipt message to merchant sales terminal 102. In some embodiments, the merchant sales terminal 102 creates a receipt based on the data contained in the receipt message.

A person skilled in the art will appreciate that from the perspective of the payment terminal 104 and the merchant sales terminal 102, there is no special formatting required and no need to install vendor or platform-specific software on the payment terminal 104 or the merchant sales terminal 102. This is because rather than transmitting data directly between the merchant sales terminal 102 and payment terminal 104, the payment terminal 104 and the merchant sales terminal 102 transmit data to the server 106. The server 106 can then repackage the data into formats compatible with the intended recipient terminals without the merchant sales terminal 102 and payment terminal 104 having to communicate directly.

In some embodiments, the first message generated and transmitted by the merchant sales terminal 102 to the server 106 includes an additional parameter, namely a post-back URL to be used for asynchronous operation. Asynchronous operation provides a degree of robustness to the system. For example, once the payment terminal 104 has been triggered to start a transaction, a customer/cardholder may take a long time to provide the relevant data to complete the transaction (e.g. authorization of the transaction amount, providing a tip amount, entering a pin number, or the like). This order of delay may result in the connection on the merchant sales terminal 102 timing out.

If there is no post-back URL parameter included in the first message, then the default for the communication is a synchronous response flow. If the post-back URL parameter is included in the first message, then an acknowledgment will be transmitted from the server 106 to the sales terminal 102 on the original socket request.

When asynchronous operation is requested, this allows the server 106 to post the receipt message to the post-back URL identified in the first message (e.g. the original HTTPS POST message transmitted by the merchant sales terminal 102). The merchant sales terminal 102 can then poll that URL until the receipt message has been posted at that URL. In some embodiments, the URL is polled periodically by the merchant sales terminal 102. This removes the need to maintain an encrypted connection with the server 106 for the period of time that the transaction is being conducted.

As part of the mechanism for asynchronous operation, the merchant sales terminal 102 may require a form of partner or merchant credential to be included with the receipt message to provide validation on the authenticity of the receipt. Examples of such credentials include an API token, or a client certificate shared between the server 106, payment terminal 104 and merchant sales terminal 102.

In some embodiments, the server 106 returns an error message to the merchant sales terminal 102 if the server 106 is unable to connect to the payment terminal 104. The error message may contain an error condition code, which provides further details as to the nature of the error. An example error condition code is an "another transaction already in progress" condition code, which indicates that the payment terminal 104 identified in the first message was already engaged in another transaction.

In some embodiments, portions of the software for the payment terminal 104 can be hosted in the server 106, rather than stored locally on the payment terminal 104. Any such portions of the software would not be accessible to the merchant or the sales terminals, which may provide enhanced security with respect to, for example, tampering or protecting sensitive data.

In some embodiments, when the payment terminal 104 is provisioned to the merchant, the server 106 keeps a record of data relating to the payment terminal 104 at a backend database in storage 118 or in another storage location. Such data relating to the payment terminal 104 includes a serial number or other unique identifier, and a record is kept which associates each payment terminal 104 with the merchant who ordered the payment terminal 104.

One possible benefit of using the systems and methods according to some embodiments is that the developer of a merchant sales terminal 102 (e.g. a tablet) has the freedom to develop and design their own software for the sales terminal 102 without having to install third party drivers to interface with the payment terminals 104. This may reduce the amount of storage space required on such embedded devices, on which storage space may be limited. Further, there is no need to update the software running on the merchant sales terminal 102 if and when a different payment terminal 104 is used or the payment terminal 104 is upgraded. All that is required is for the merchant sales terminal developer to ensure that transaction requests are initiated with an HTTPS POST message, or another suitable format for communication with the server 106. In some embodiments, the merchant sales terminal 102 does not communicate directly with server 106, and instead communicates via a network server on the merchant side, and the server on the merchant side communicates directly with the server 106.

It should be appreciated that from the perspective of the merchant sales terminal 102, there is no difference between the format of the data which would normally be received directly from a payment terminal 104 (using the appropriate drivers and APIs) in systems in which the payment terminal 104 acts as a server, and the data which is received from server 106 in the present application.

It should also be noted that the server 106 comprises a storage element 118 which may store an application programming interface (API) which includes commands for all transaction features supported by the merchant sales terminal 102 and the payment terminal 104 (e.g. fraud tools, tipping, or the like). Thus, the functionality of the sales terminal 102 and payment terminal 104 are preserved, according to some embodiments.

Using the server 106 described herein, the merchant sales terminal 102 does not have be integrated or directly compatible with the software running on the payment terminal 104. All communication between the payment terminal 104 and the sales terminal 102 is routed via the server 106, which processes and re-packages the data for compatibility with the intended recipient device. In addition to being device-agnostic and operating system-agnostic in terms of the merchant sales terminal 102, the platform running on the server 106 can also operate with virtually any payment terminal 104 supported by current platforms (e.g. Ingenico and VeriFone devices).

In some embodiments, non-financial transactions can be initiated by the server 106. The server 106 may also initiate communications and execute commands with the payment terminal 104 which are not related to transactions. For example, the server 106 may include an upgrade module configured to query the payment terminal 104 to request the version of the software running on payment terminal 104. If the server 106 determines the software on payment terminal 104 to be capable of an upgrade, the server may push a software update to the payment terminal 104. In some embodiments, the server 106 may push a software update to the payment terminal 104 without first requesting the version of the software.

In some embodiments, the server 106 initiates transaction settlements. For example, transactions may be handled using a draft capture method, according to which server 106 maintains a record of transactions that are authorized and ready for settlement. Server 106 may send a request to payment terminal 104 for instructions to settle the authorized transactions. Payment terminal 104 may, in response, send an instruction to server 106 to proceed with settlement.

Alternatively or additionally, merchant sales terminal 102 may maintain a record of authorized transactions for later provision to server 106 for settlement. The record may include, for example, transaction identifiers, and transaction parameters, which may be encrypted. Server 106 may send a request to merchant sales terminal 102 for provision of transactions to be settled. In response, merchant sales terminal 102 may send the record of authorized transactions, which server 106 may proceed to settle.

Server 106 may, for example, initiate settlement at a predefined period, such as at the end of a business day, or upon the record of authorized transactions reaching a defined size or monetary value.

In some embodiments, the merchant terminal 102 or a merchant server sends a command to server 106 to initiate the closing or settlement of transactions. In some embodiments, the server 106 initiates closing or settlement automatically (e.g. at the end of a business day or at the time a particular merchant closes for the day).

In some embodiments, the server 106 instructs the payment terminal 104 to disconnect from the server 106. This functionality may assist in managing connections on server 106, as there may be many payment terminals 104 connected to server 106 at any given time, potentially thousands or tens of thousands of devices. Moreover, there may be a plurality of servers 106 in operation. If a given server 106 is scheduled for or requires maintenance, the server 106 can issue a command to one or more connected payment terminals 104 to disconnect and connect to a different server.

In some embodiments, the server may send a command to the payment terminal 104 instructing the payment terminal 104 to disconnect from the server 104 for a defined period of time before reconnecting to server 106. For example, the server 106 can instruct the payment terminal 104 to disconnect from the server when the merchant's store has closed, and instruct the payment terminal to reconnect to the server 106 when the merchant's store opens (e.g. a 12 hour period).

In some embodiments, the server sends a command to payment terminal 104 instructing the payment terminal 104 to disconnect from the server 106 without defining a time at which to reconnect. Once disconnected, the payment terminal 104 may reconnect to server 106 by a user actuating a key on the keypad of the payment terminal 104, or by a user unplugging the payment terminal 104 and then plugging the payment terminal back in, for example power cycling payment terminal 104 by disconnecting and reconnecting a power cable, or disconnecting and reconnecting a network cable.

Some embodiments disclosed herein allow for a more simple, secure and device/OS-agnostic solution that allows for communication between any IP communications-enabled merchant sales terminal 102 and payment terminal 104. The cloud-based server 106 can act as a conduit for messaging between the merchant sales terminal 102 and the payment terminal 104, and does not require direct communication between the merchant sales terminal 102 and the payment terminal 104. As such, some embodiments obviate the need for installation of payment terminal-related software locally on merchant sales terminals, which was previously required to facilitate communication between sales terminals 102 and payment terminals 104. Some embodiments also allow for remote monitoring of and reporting on connected devices. Some embodiments abstract the formatting of transactional messages into a central location.

Although the embodiments have been described in detail, it should be understood that various changes, substitutions and alterations can be made herein.

Moreover, the scope of the present application is not intended to be limited to the particular embodiments described in the specification. As one of ordinary skill in the art will readily appreciate from the disclosure of the present application, processes, machines, manufactures, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufactures, compositions of matter, means, methods or steps.

As can be understood, the examples described above are intended to be exemplary only. The invention is defined by the appended claims.

The invention claimed is:

1. A computer server for payment processing, comprising:
a network interface;
a processor;

a memory containing non-transitory computer-readable instructions that, when executed by said processor, cause the server to:
  receive a connection request from a payment terminal by way of said network interface, wherein the connection request is for a network connection between the payment terminal and the computer server;
  form an encrypted network connection with said payment terminal; receive a pairing request identifying said payment terminal from a merchant sales terminal;
  associate said payment terminal with said merchant sales terminal in a data structure;
  receive a first message from said merchant sales terminal defining transaction parameters in a first data format;
  generate a second message containing said transaction parameters in a second data format compatible with said payment terminal;
  send said second message to said payment terminal over said encrypted network connection;
  receive a payment credential message from said payment terminal over said encrypted network connection in said second data format;
  generate a receipt message in said first data format; and
  send said receipt message to said merchant sales terminal.

2. The computer server of claim 1, wherein said first data format is hypertext transfer protocol (HTTP) and said first message comprises an HTTP POST message.

3. The computer server of claim 1, wherein said association of said payment terminal comprises sending an association confirmation message to each of said merchant sales terminal and said payment terminal.

4. The computer server of claim 1, wherein said encrypted network connection comprises a transport layer security (TLS) or secure sockets layer (SSL) connection.

5. A method of processing payments comprising, at a server:
  receiving a connection request from a payment terminal by way of a network interface, wherein the connection request is not routed through a merchant sales terminal;
  forming an encrypted network connection with said payment terminal;
  receiving, from the merchant sales terminal, a pairing request identifying said payment terminal;
  associating said payment terminal with said merchant sales terminal in a data structure;
  receiving a first message from said merchant sales terminal defining transaction parameters in a first data format;
  forming a second message containing said transaction parameters in a second data format compatible with said payment terminal;
  sending said second message to said payment terminal over said encrypted network connection;
  receiving a payment credential message from said payment terminal over said encrypted network connection in said second data format;
  generating a receipt message in said first data format; and
  sending said receipt message to said merchant sales terminal.

6. The method of claim 5, wherein said first data format is hypertext transfer protocol (HTTP) and said first message comprises an HTTP POST message.

7. The method of claim 5, wherein said associating said payment terminal comprises sending an association confirmation message to each of said merchant sales terminal and said payment terminal.

8. The method of claim 5, wherein said encrypted network connection comprises a transport layer security (TLS) or secure sockets layer (SSL) connection.

9. The method of claim 5, further comprising:
  prior to receiving the payment credential message, sending an error message to the merchant sales terminal if delivery of the second message to the second server is unsuccessful.

10. The method of claim 5, wherein the first message comprises an asynchronous communication parameter comprising a uniform resource locator (URL), and wherein sending said receipt message to said merchant sales terminal comprises sending said receipt message to the URL.

11. The method of claim 10, further comprising the merchant sales terminal polling the URL for said receipt message.

12. The method of claim 5, further comprising sending at least one computer-executable instruction from the server to the payment terminal for execution by the payment terminal.

13. The method of claim 5, further comprising:
  transmitting, by the server, a software upgrade to the payment terminal.

14. The method of claim 5, further comprising:
  querying the payment terminal for a software version identifier;
  receiving the software version identifier from the payment terminal; and
  transmitting a software upgrade to the payment terminal based on the received software version identifier.

15. The method of claim 5, further comprising:
  transmitting, to the payment terminal, an instruction to disconnect from the server.

16. The computer server of claim 1, wherein the processor is further configure to send an error message to the merchant sales terminal if delivery of the second message to the second server is unsuccessful.

17. The computer server of claim 1, wherein the first message comprises an asynchronous communication parameter comprising a uniform resource locator (URL), and wherein sending said receipt message to said merchant sales terminal comprises sending said receipt message to the URL.

18. The computer server of claim 1, wherein the memory contains computer-readable instructions for execution by said payment terminal.

19. The computer server of claim 1, further comprising an upgrade module configured to transmit a software upgrade to the payment terminal.

20. The computer server of claim 1, wherein the processor is further configured to query the payment terminal for a software version identifier, receive the software version identifier from the payment terminal, and transmit a software upgrade to the payment terminal based on the received software version identifier.

21. The computer server of claim 1, wherein the connection request is not routed through the merchant sales terminal.

22. The method of claim 5, wherein the connection request is for a network connection between the payment terminal and the computer server.

* * * * *

UNITED STATES PATENT AND TRADEMARK OFFICE
CERTIFICATE OF CORRECTION

PATENT NO. : 10,956,885 B2
APPLICATION NO. : 16/098822
DATED : March 23, 2021
INVENTOR(S) : Shem Ali et al.

Page 1 of 1

It is certified that error appears in the above-identified patent and that said Letters Patent is hereby corrected as shown below:

In the Claims

Column 11, Line 3, Claim 1 replace the words "cause the server to:" with -- cause the computer server to: --

Column 12, Line 64, Claim 22 replace the words "terminal and the computer server." with -- terminal and the server. --

Signed and Sealed this
Fifteenth Day of June, 2021

Drew Hirshfeld
*Performing the Functions and Duties of the*
*Under Secretary of Commerce for Intellectual Property and*
*Director of the United States Patent and Trademark Office*